INVENTORS
JOSEPH H. GORDON
THEODORE W. KWAP

ATTORNEY

INVENTORS
JOSEPH H. GORDON
THEODORE W. KWAP

ATTORNEY 3,235,787
TRANSISTORIZED VOLTAGE REGULATOR
WITH OVERLOAD PROTECTION
Joseph H. Gordon, Bronx, and Theodore W. Kwap, Brewster, N.Y., assignors to General Precision, Inc., a corporation of Delaware
Filed Dec. 17, 1962, Ser. No. 245,092
1 Claim. (Cl. 323—22)

This invention relates generally to D.C. voltage regulators and particularly to such regulators which provide for the protection of both the load and the regulator against the adverse effects of severe overloads such as short circuits.

The usual electronic voltage regulator includes a device such as a tube or transistor which senses small changes in output voltage, amplifies these changes, and utilizes the resulting signal to control the conductivity of a series element such as another tube or transistor. In the past, overload protection has been obtained by various expedients such as the use of circuit breakers and/or the use of an additional element such as a tube or transistor responsive to load current which also controls the conductivity of the series element. Such arrangements, while satisfactory for some purposes, have had slow response time and/or have failed to limit the current sufficiently and/or have locked the circuit open thereby requiring manual intervention to re-establish operation.

It is a general object of the present invention to provide an electronic voltage regulator having improved overload protection characteristics.

Another object is to provide a regulator which limits the current to a safe value.

Another object is to provide a protective circuit in a regulator which responds quickly to overloads.

Another object is to provide a regulator including overload protection which automatically re-establishes service upon removal of the cause of the overload.

Briefly stated, a regulator in accordance with the invention employs the usual series element the conductivity of which is controlled. The output voltage is sensed by a differential amplifier, the first input to which is a voltage proportional to the output voltage and the second input to which is a voltage which, during normal operation, differs from the output voltage by a fixed amount. Normally the latter voltage changes more rapidly than the former and controls the conductivity of the series element to minimize output voltage variations. Upon the occurrence of a heavy overload, such as a short circuit, the output voltage decreases beyond the capability of the system to restore it. When the output voltage falls to a predetermined value, the first input loses control whereupon the second input controls the series element in such a sense as to decrease its conductivity as the output voltage falls. The action is regenerative and quickly brings the output voltage near or to zero. At this time a series of voltage pulses is applied so as to render the series element conductive periodically with sufficient time intervals between pulses so that the average power dissipating capabilities of the series element are not exceeded even if the output be short-circuited. If the overload persists, the output voltage cannot rise and current flows only intermittently. However, as soon as the cause of the overload is removed, the initiation of conduction of the series element by the next pulse causes the output voltage to rise whereupon normal regulation is reestablished.

For a clearer understanding of the invention, reference may be made to the following detailed description and the accompanying drawings, in which.

Figure 1:
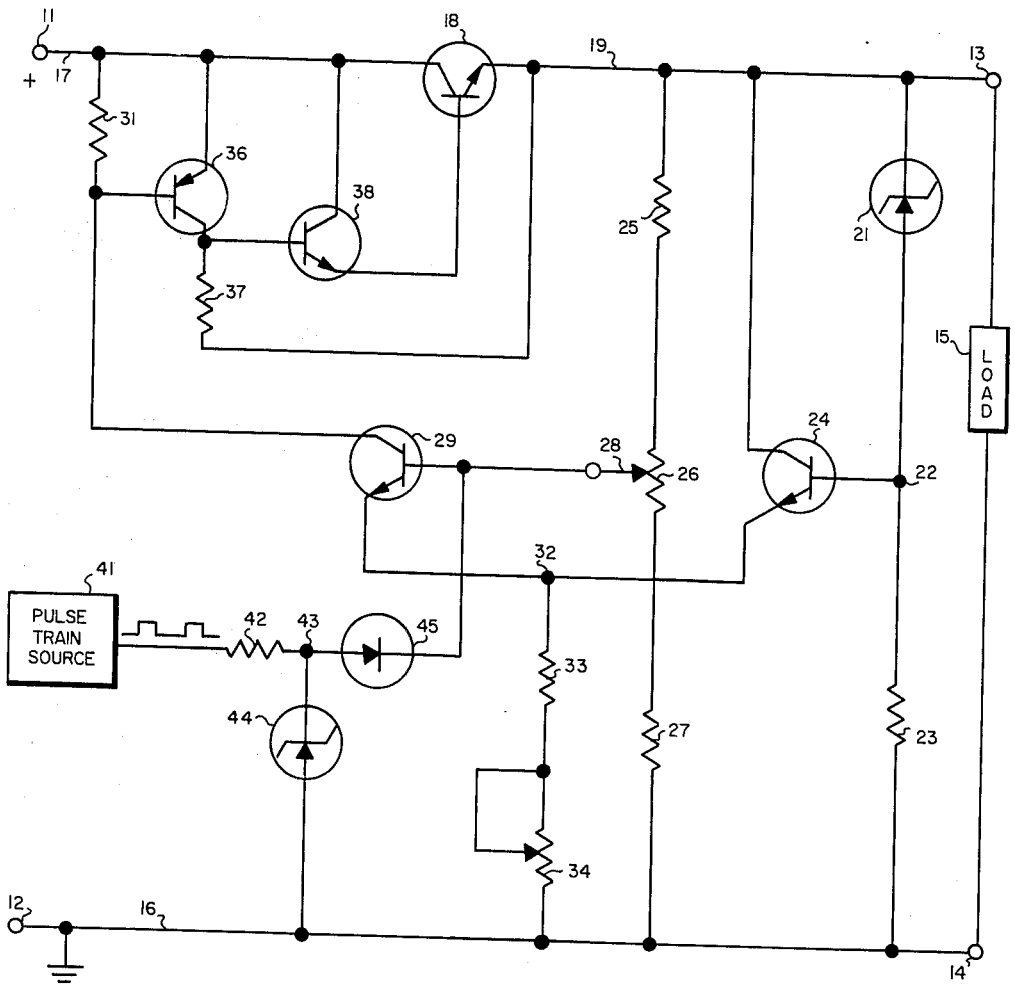
FIGURE 1 is a schematic diagram of a preferred embodiment of the invention.

Referring first to FIGURE 1, a pair of terminals 11 and 12 are adapted to be connected to the positive and negative terminals respectively of an unregulated source of direct current power. Output terminals 13 and 14 are for connection to a utilization device shown schematically as a load 15. The terminals 12 and 14 are connected together by a common conductor or ground bus 16. The terminal 11 is connected to an input conductor 17 which in turn is connected to the collector of an NPN transistor 18. The emitter of the transistor 18 is connected to an output conductor 19 which in turn is connected to the output terminal 13. It is apparent that the output voltage can be controlled by controlling the conductivity of the transistor 18.

A Zener diode 21 has its cathode connected to the conductor 19 and its anode connected to a junction 22 which is also connected through a resistor 23 to ground. The diode 21 operates as a constant voltage device and, although shown schematically as a single diode, may comprise more than one or may be a different kind of constant voltage device such as a glow tube. The diode 21 functions, during normal operation of the regulator, to maintain the potential of the junction 22 at a fixed amount below that of the conductor 19. The junction 22 is connected to the base of an NPN transistor 24 the collector of which is connected to the conductor 19.

A resistor 25, a potentiometer 26, and a resistor 27 are serially connected in that order from the conductor 19 to the conductor 16. The slider 28 of the potentiometer 26 is connnected to the base of an NPN transistor 29 the collector of which is connected through a resistor 31 to the input conductor 17. The emitters of the transistors 24 and 29 are both connected through a fixed resistor 33 and a variable resistor 34 to the ground bus 16.

The junction of the resistor 31 and the collector of the the transistor 36 is also connected to the base of a NPN sistor 36 the emitter of which is connected to the conductor 17 and collector of which is connected through a resistor 37 to the output conductor 19. The collector of the transistor 36 is also connected to the base of an NPN transistor 38 the collector of which is connected to the conductor 17 and the emitter of which is connected to the base of the transistor 18.

The transistors 24 and 29, by virtue of the circuit connections above described, comprise a differential amplifier which amplifies the difference between the potentials of the slider 28 and the junction 22. The output of the differential amplifier appears at the collector of the transistor 29 and operates, through the transistors 36 and 38, to control the conductivity of the transistor 18 so as to minimize changes in the output voltage. More specifically, let it be assumed that the regulator is initially operating normally and that for some reason, such as a change in the load, the voltage of the output conductor 19 starts to fall. The potential of the slider 28 falls a proportional amount due to the action of the resistive voltage divider comprising the resistors 25, 26, and 27. However, the potential of the junction 22 falls by the full amount of the decrease in potential of the conductor 19 because of the action of the constant voltage device 21. The conductivity of the transistor 24 decreases and the potential of the junction 32 tends to fall more rapidly than the potential of the slider 28 with the result that the base-emitter bias of the transistor 29 increases causing an increase in the conductivity of the transistor 29. This happens very rapidly and the increase in current through the transistor 29 is substantially equal to the decrease in current through the transistor 24.

The increased current drawn by the transistor 29 causes the potential of the base of the transistor 36 to decrease.

Since this is a PNP transistor, a decrease in base potential causes the conductivity to increase, making the potential of the collector of the transistor 36 more positive. This more positive potential appears at the base of the transistor 38, increasing its conductivity. This has the effect of raising the potential of the base of the transistor 18 thereby increasing its conductivity and increasing the output voltage appearing on the conductor 19. Thus the original decrease in output voltage is minimized. Obviously a similar but opposite sequence of events would occur should the output voltage tend to increase.

The above described mode of operation is that which takes place under normal operating conditions. Upon the occurrence of an overload, both the load and the series transistor 18 are protected against the adverse effects of excessive current. Let it be supposed that the load increases excessively. The voltage of the conductor 19 starts to fall and the previously described regulator action attempts to restore the output voltage. If the overload is severe, such as that occasioned by a short circuit, the regulator will be unable to restore the voltage even with the transistor 18 operating at maximum conductivity. Such a condition, if allowed to persist, would certainly destroy the transistor 18 and might also damage other components. However, as the voltage of the conductor 19 falls, the voltage of the junction 22 also falls, eventually approaching the voltage of the junction 32 at which time the transistor 24 ceases conduction entirely. At the same time the voltage of the slider 28 is also falling but without the corresponding tendency of the junction 32 to fall in potential. Accordingly, the conductivity of the transistor 29 decreases and, in sequence, the voltage at the base of the transistor 36 becomes more positive, the conductivity of the transistor 36 decreases, the potential of the base of the transistor 38 becomes more negative, the current through the transistor 38 decreases, the conductivity of the transistor 18 decreases, and the voltage on the output conductor 19 decreases. A corresponding decrease in voltage appears on the slider 28 so that the action is regenerative and the output voltage is soon brought near or to zero with all of the transistors virtually cut off. Thus both the load and the regulator are protected from the adverse effects of overloads.

With the apparatus so far described, removal of any short circuit in the load cannot, by itself, restore the output voltage. Accordingly, additional apparatus is provided to restore service automatically. As shown, a source 41 of positive voltage pulses is connected through a resistor 42 to a junction 43. A constant voltage device such as a Zener diode 44 has its cathode connected to the junction 43 and its anode connected to the ground bus 16. The Zener diode 44 prevents the voltage of the junction 43 from rising above a predetermined value. The junction 43 is also connected to the anode of a diode 45, the cathode of which is connected to the base of the transistor 29. The parameters of the regulator are chosen so that during normal operation the potential of the slider 28 and the base of the transistor 29 is substantially above that of the junction 43 so that the diode 45 is back biased and the pulses from the source 41 cannot reach the transistor 29. But during overload conditions as above described, the potential of the slider 28 is near zero allowing a pulse to pass to the base of the transistor thereby rendering it conductive. The resulting decrease in collector potential operates as previously described to increase the conductivity of the transistor 18. If the overload conditions still obtain, the voltage of the conductor 19 cannot rise appreciably and current flows through the transistor 18 only during the pulse. When the short circuit is removed, the next pulse renders the transistor 18 conductive thereby raising the potential of the conductor 19 whereupon normal operation is restored.

The source 41 may be a separate source such as a multivibrator provided for the purpose or, in some cases, may be found to be already available in the equipment with which the regulator is used. The pulse width and repetition frequency are not critical but should be such that the average power dissipation rating of the transistor 18 is not exceeded under short circuit conditions.

It is to be noted that the train of pulses could be applied to other points in the circuit, it only being necessary to interrupt momentarily the previously mentioned regenerative action. While the arrangement shown in FIGURE 1 is preferred at present, an alternative arrangement is shown in FIGURE 2.

Figure 2:
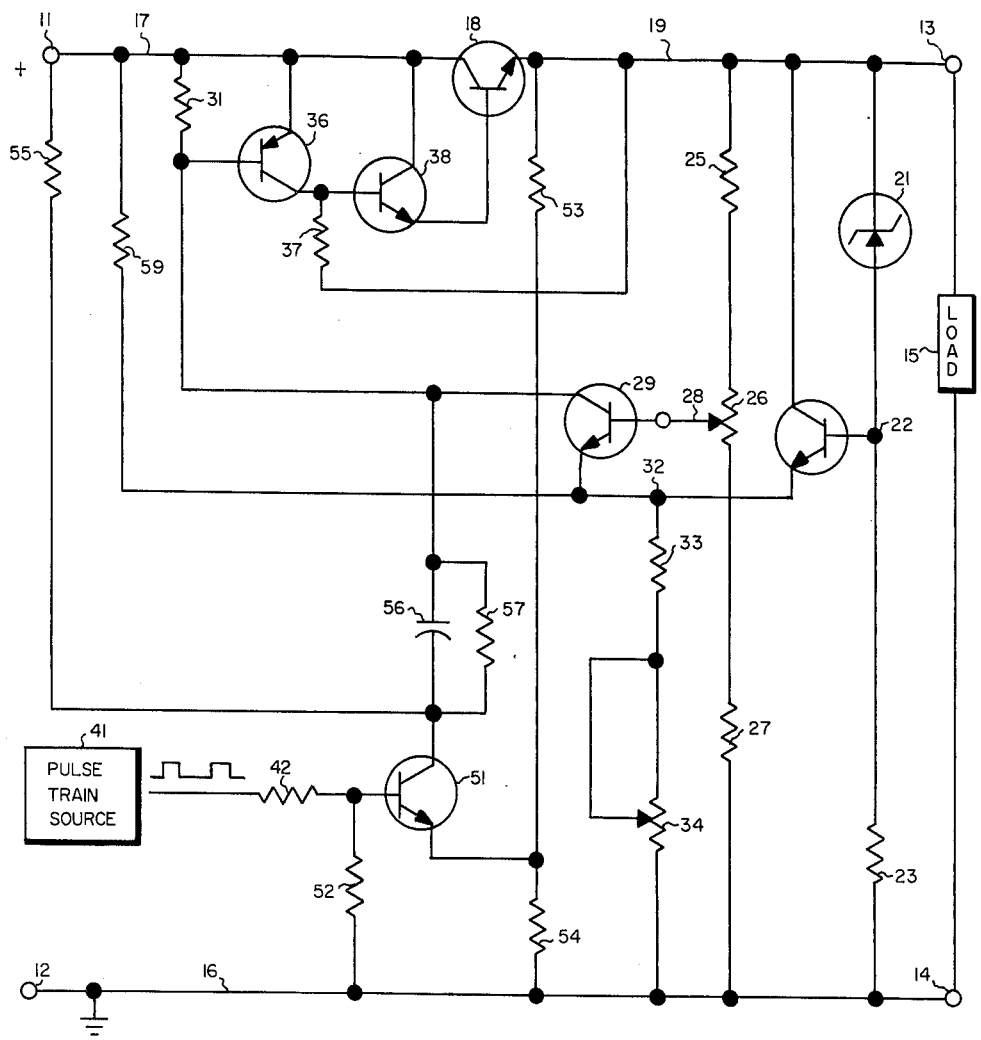
FIGURE 2 is a schematic diagram of a modification of the invention.

Referring now to FIGURE 2, the pulse train source 41 is connected through the resistor 42 to the base of a NPN transistor 51 which is also connected through a resistor 52 to the ground conductor 16. The emitter of the transistor 51 is connected to the junction of resistors 53 and 54 which are serially connected in that order from the conductor 19 to the conductor 16. The collector of the transistor 51 is connected through a resistor 55 to the conductor 17. The collector is also connected to one plate of a capacitor 56, the other plate of which is connected to the base of the transistor 36. A resistor 57 shunts the capacitor 56.

Operation is similar to that previously described. Positive pulses from the source 41 render the transistor 51 conductive periodically. The capacitor 56 starts to charge, drawing current through the resistor 31 and the base of the transistor 36. The resulting conduction of the transistor 36 renders the transistor 18 conductive. If the short circuit conditions are still in effect, conduction ceases after the capacitor 56 discharges through the resistor 57. If the short circuit is removed, normal regulation is restored by the next pulse. When the voltage of conductor 19 rises to its normal value, the emitter of the transistor 51 is biased by the resistors 53 and 54 sufficiently so that pulses from the source 41 cannot render the transistor 51 conductive.

Also shown in FIGURE 2 is a resistor 59 connected between the input conductor 17 and the junction 32. In some cases this resistor is necessary in order to establish the proper potential at the junction 32 although in other cases it is superfluous.

Although the invention has been described specifically for illustrative purposes, many modifications will occur to those skilled in the art. It is therefore desired that the the protection afforded by Letters Patent be limited only by the true scope of the appended claim.

What is claimed is:

A voltage regulator, comprising,
  an input circuit including first and second terminals adapted to be connected to a source of unregulated direct current,
  an output circuit including a third terminal and said second terminal adapted to be connected to a useful load device,
  a first transistor including a collector, an emitter and a base,
  the collector-emitter circuit of said first transistor being connected between said first and third terminals,
  second and third transistors each including a collector, an emitter and a base,
  said emitters of said second and third transistors being connected together and through a common resistive path to said second terminal,
  said base of said second transistor being connected to an intermediate point of a resistive voltage divider connected between said second and third terminals,
  said base of said third transistor being connected to the junction of a resistor and a constant voltage device serially connected in that order between said second and third terminals,
  said collector of said third transistor being connected to said third terminal,
  whereby a progressive reduction in voltage between said second and third terminals decreases the conductivity of said third transistor and increases the conductivity of said second transistor until said third transistor is virtually cut off whereupon further reduction of the voltage between said second and third terminals reduces the conductivity of said second transistor, a source of periodically recurring voltage pulses, means operative when the potential of said base of said second transistor reaches a predetermined magnitude for applying said pulses from said source to said base of said second transistor, and means connected to said collector of said second transistor for varying the conductivity of said first transistor in the same sense as the variations in conductivity of said second transistor.

References Cited by the Examiner

UNITED STATES PATENTS

| | | | |
|---|---|---|---|
| 2,967,251 | 1/1961 | Dodge | 323—22 |
| 3,122,697 | 2/1964 | Kauders | 323—22 |
| 3,185,856 | 5/1965 | Harrison | 323—22 |

LLOYD McCOLLUM, *Primary Examiner.*

H. B. KATZ, *Assistant Examiner.*